(12) United States Patent
Komuro et al.

(10) Patent No.: US 10,976,418 B2
(45) Date of Patent: *Apr. 13, 2021

(54) METHOD FOR IDENTIFYING NOISE DATA OF LASER RANGING DEVICE

(71) Applicant: HONDA MOTOR CO., LTD., Tokyo (JP)

(72) Inventors: Satoshi Komuro, Saitama (JP); Hiroki Iikura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 492 days.

This patent is subject to a terminal disclaimer.

(21) Appl. No.: 15/913,317

(22) Filed: Mar. 6, 2018

(65) Prior Publication Data

US 2018/0267153 A1    Sep. 20, 2018

(30) Foreign Application Priority Data

Mar. 14, 2017 (JP) ............................. JP2017-048892

(51) Int. Cl.
*G01S 7/487* (2006.01)
*G01S 17/08* (2006.01)
*G01S 17/42* (2006.01)

(52) U.S. Cl.
CPC ............ *G01S 7/4876* (2013.01); *G01S 17/08* (2013.01); *G01S 17/42* (2013.01)

(58) Field of Classification Search
CPC ............................... G01S 7/4876; G01S 17/08
USPC ....................................................... 702/159
See application file for complete search history.

(56) References Cited

FOREIGN PATENT DOCUMENTS

JP    2004-234349    8/2004
WO   2014/132509    9/2014

*Primary Examiner* — Ricky Ngon
(74) *Attorney, Agent, or Firm* — Rankin, Hill & Clark LLP (57) ABSTRACT

The present invention provides a method for identifying noise data of a laser ranging device. An n number of measurement points P(i), P(i−1) and P(i+1) corresponding to an n number of projection lines that are adjacent to each other are extracted from a plurality of measurement points at which distances have been measured by a laser ranging device 1. An approximate straight line L(i) that passes through the n number of measurement points is calculated. A degree of inclination e(i) of the approximate straight line L(i) with respect to the representative line among the projection lines corresponding to the n number of measurement points is determined. If the degree of inclination is smaller than a predetermined threshold value, then the measurement data on a measurement point having a largest distance measurement value among the n number of measurement points is identified as noise data.

4 Claims, 4 Drawing Sheets

DISTANCE OF OBJECT A: LARGE

FIG. 4B

DISTANCE OF OBJECT A: SMALL

METHOD FOR IDENTIFYING NOISE DATA OF LASER RANGING DEVICE

BACKGROUND OF THE INVENTION

Field of the Invention

The present invention relates to a method for identifying low-reliability noise data among measurement data obtained by a laser ranging device, such as a laser range finder.

Description of the Related Art

A laser ranging device, such as a laser range finder, is configured to be capable of emitting a scanning laser beam to measure the distance between a plurality of measurement points (the reflection points of a laser beam) in the range of the scanning. This type of laser ranging device is used as, for example, a sensor for recognizing the external shape of an object, or a sensor for recognizing an environment in the operating environment of a mobile body (refer to, for example, International Application Publication No. WO2014/132509 and Japanese Patent Application Laid-Open No. 2004-234349).

In a laser ranging device, such as a laser range finder, if a laser beam projection line (a line that provides the path of a laser beam) corresponding to a certain measurement point is a line that passes through the vicinity of the edge of an object that exists in the scanning range of a laser beam, then the reflected light of the object and the reflected light of another object at the back side of the object will frequently be received by the laser ranging device (i.e. a multi-echo will occur). In this case, the measurement data of the distance of a measurement point on the projection line tends to be abnormal measurement data. For example, a situation may occur, in which an actual object does not exist at the position indicated by the measurement data.

Thus, if the laser beam projection line is a line that passes through the vicinity of the edge of an object, then the measurement data of the distance of a measurement point on the projection line tends to be abnormal measurement data that deviates from the position where an actual object exists.

Using such measurement data as it is to recognize the shape or the position of an object will cause the shape or the position of the object to be erroneously recognized.

Therefore, if the measurement data of a distance obtained by a laser ranging device includes the abnormal measurement data described above, then a technique for properly identifying such abnormal measurement data as noise data is desired.

As a technique for identifying abnormal noise data, there is, for example, a widely known technique whereby to identify measurement data that indicates a so-called isolated point as abnormal noise data. However, according to this technique, it is difficult to properly identify an isolated point unless a large quantity of measurement data is acquired.

Further, in the measurement data of distances obtained by a laser ranging device, the measurement data of a plurality of measurement points at positions that are relatively close to each other frequently becomes abnormal noise data. In this case, the noise data cannot be identified as the data of isolated points.

SUMMARY OF THE INVENTION

The present invention has been made in view of the background described above, and it is an object of the invention to provide a method that makes it possible to properly identify low-reliability noise data among the measurement data obtained by a laser ranging device.

To this end, a method for identifying noise data of a laser ranging device in accordance with the present invention is a method for identifying noise data among measurement data of distances obtained by a laser ranging device that emits a laser beam in a predetermined direction to measure the distance of each of a plurality of measurement points corresponding to a plurality of projection lines of the laser beam in a scanning range of the laser beam, including:

a first step of extracting an n (n: an integer of 2 or more) number of measurement points corresponding to an n number of projection lines that are close to each other from the plurality of measurement points;

a second step of calculating an approximate straight line that passes through the n number of measurement points by using the measurement data of the distance of each of the n number of measurement points;

a third step of determining the degree of inclination of the approximate straight line with respect to a representative line of the projection lines corresponding to the n number of measurement points or an averaged line, which is a line in a direction obtained by averaging the directions of the projection lines corresponding to the n number of measurement points; and a fourth step of identifying, as noise data, the measurement data on a measurement point having a largest distance measurement value among the n number of measurement points in the case where the degree of inclination is smaller than a predetermined threshold value (a first aspect of the invention).

A supplementary description will be given of the terms in the present invention. The term "projection line" means a line that indicates the path of a laser beam output in the scanning range by a laser ranging device.

Further, the phrase "an n number (n: an integer of 2 or more) of projection lines that are close to each other" means an n number of projection lines that are included in a partial local range in the entire scanning range.

In this case, in a laser ranging device that emits a laser beam such that the direction of the laser beam changes, the phrase "an n number (n: an integer of 2 or more) of projection lines that are close to each other" means an n number of projection lines, the directions of which are close to each other (e.g. the difference in direction remains within a specified range).

Further, in a laser ranging device that maintains laser beams in fixed directions and performs linear scanning of the laser beams, the phrase "an n (n: an integer of 2 or more) number of projection lines that are close to each other" means an n number of projection lines, the positions of which are close to each other (e.g. the difference in position remains within a specified range).

According to various experiments and studies by the inventors of the present application, if the measurement data of any one of the n number of measurement points is abnormal noise data attributable to a multi-echo, then the degree of inclination of the foregoing approximate straight line tends to be small.

According to the present invention, therefore, if the degree of inclination is smaller than a predetermined threshold value, then the measurement data on a measurement point having a largest distance measurement value among the n number of measurement points will be identified as noise data.

Thus, according to the present invention, low-reliability noise data can be properly identified among measurement data obtained by a laser ranging device.

In the first aspect of the invention described above, preferably, the method is configured such that the processing from the first step to the fourth step is repeatedly carried out, and the processing in the first step of each cycle is carried out such that at least one measurement point among an n number of measurement points extracted in the first step of each cycle of the repetition is a measurement point that is different from measurement points extracted in the first step of another cycle (a second aspect of the invention).

With this arrangement, noise data can be identified in an entire or substantially entire scanning range of a laser beam.

Further, in the first aspect of the invention or the second aspect of the invention described above, the method preferably further includes a fifth step of variably setting the predetermined threshold value used in the fourth step according to a representative value of the distance measurement values of the n number of measurement points or an average distance value obtained by averaging the distance measurement values of the n number of measurement points (a third aspect of the invention).

With this arrangement, the reliability of the identification of the noise data can be further enhanced.

DESCRIPTION OF THE PREFERRED EMBODIMENTS

Figure 1A:
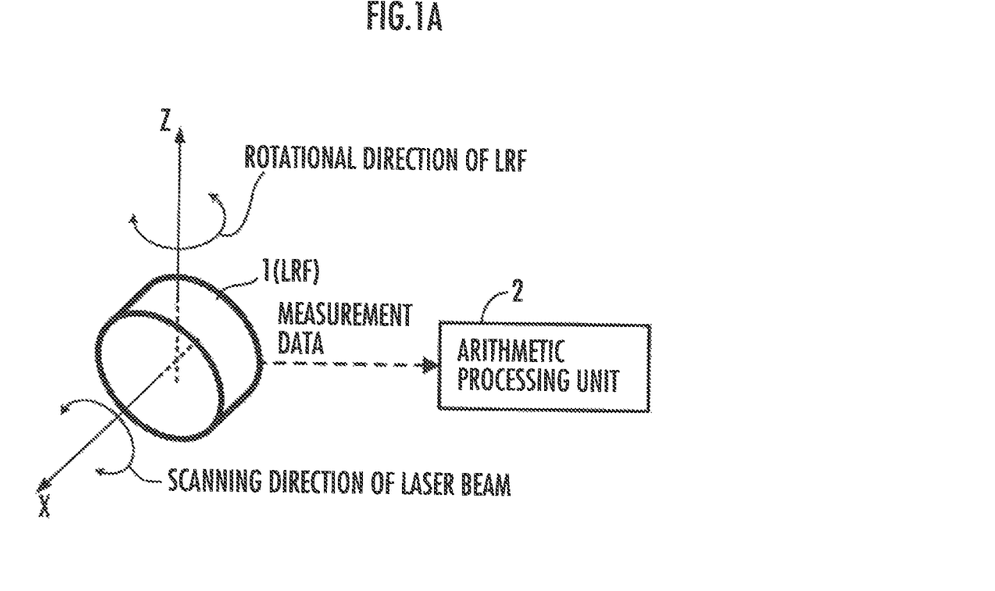
FIG. 1A is a schematic perspective view of a laser ranging device (laser range finder) according to an embodiment of the present invention.
Figure 1B:
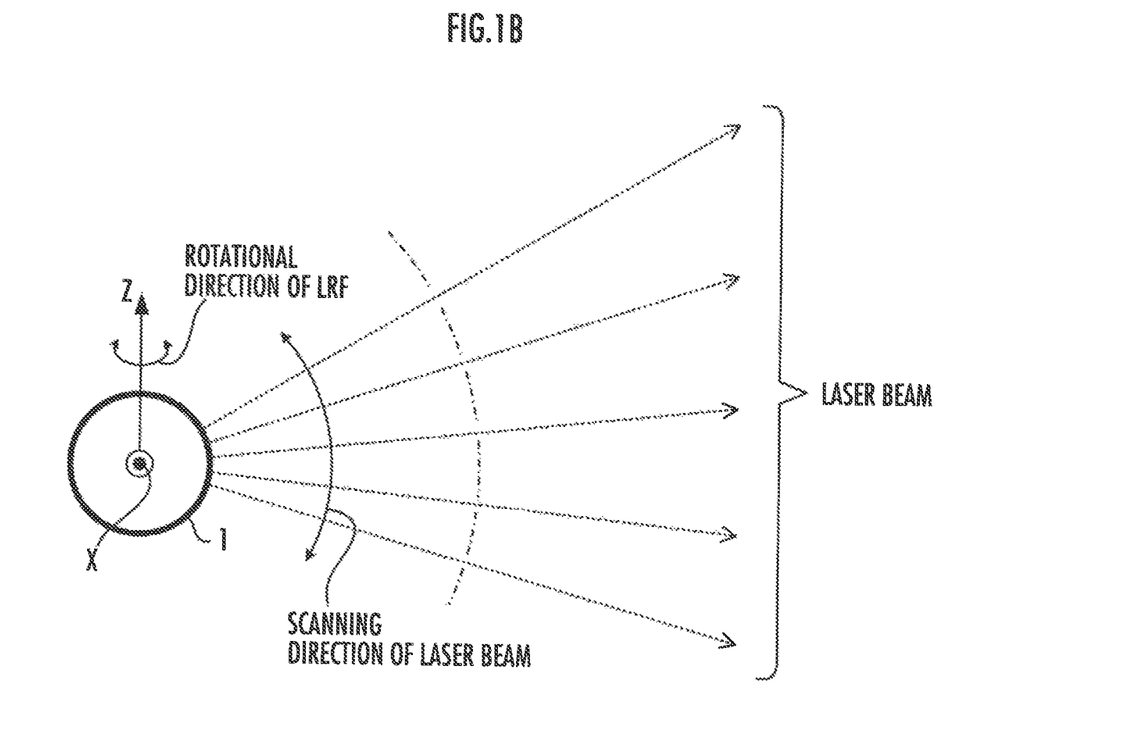
FIG. 1B is a diagram illustrating the laser ranging device observed in an X-axis direction of FIG. 1A.

An embodiment of the present invention will be described with reference to FIG. 1A to FIG. 4B. Referring to FIG. 1A and FIG. 1B, a laser ranging device 1 to be described in the present embodiment is a laser range finder, and will be hereinafter referred to as LRF 1.

The LRF 1 has a publicly known structure, and outputs a laser beam to perform scanning in a predetermined scanning range (a predetermined angle range) in a direction about a single axis, e.g., in the direction of the X-axis illustrated in FIG. 1A and FIG. 1B. More specifically, the LRF 1 outputs a laser beam such that projection lines, which indicate the projecting directions of the laser beam (the lines that provide the projection paths of the laser beam, namely, the lines illustrated by the dashed lines in FIG. 1B), are rotated in the direction about the X-axis in the predetermined angle range, as illustrated in FIG. 1B.

Then, for each of a plurality (a predetermined number) of projecting directions of the laser beams in the scanning range, the LRF 1 measures the distance of an object that reflects the laser beam output in each projecting direction (distance from the LRF 1) according to a time-of-flight (TOF) measurement technique, and outputs the measurement data. In this case, the plurality of projecting directions of the laser beam are, for example, the directions shifted by a predetermined pitch angle in the direction about the X-axis.

Further, the LRF 1 according to the present embodiment is connected to an actuator, such as an electric motor, which is not illustrated, such that the LRF 1 can be rotated by the actuator in a direction orthogonal to the X-axis direction, e.g., in the direction about a Z-axis illustrated in FIG. 1A and FIG. 1B.

Thus, the orientation of the LRF 1 can be changed in the direction about the Z-axis, and the laser beam scanning can be performed in the direction about the X-axis at a plurality of rotational angular positions of the LRF 1 in the direction about the Z-axis. This makes it possible to acquire, in a three-dimensional manner, the measurement data of the distance of an object existing in the vicinity of the LRF 1.

To acquire, in the three-dimensional manner, the measurement data of the distance of an object existing around the LRF 1, the laser beam scanning may be performed in the direction about the X-axis (i.e. the projection line may be rotated in the direction about the X-axis) while rotating the LRF 1 in the direction about the Z-axis. In this case, the measurement data corresponding to each set of each of the plurality of rotational angular positions of the LRF 1 in the direction about the Z-axis and each of the plurality of projection lines of a laser beam in the direction about the X-axis can be acquired by, for example, rotating the LRF 1 at a rotational speed that enables the rotational angle (the rotational angle in the direction about the Z-axis) of the LRF 1 per scanning period of the laser beam in the direction about the X-axis to remain a sufficiently small angle.

The LRF 1 can be mounted in a mobile body, such as, for example, a mobile robot and a vehicle. In this case, the LRF 1 can be used as an external world recognition sensor for recognizing the position, the outer contour or the like of an object (a ground surface, a floor surface, an installed object, an obstacle, another mobile body, or the like) that exists in the vicinity of a mobile body.

According to the present embodiment, the measurement data of the LRF 1 is input to an arithmetic processing unit 2 (illustrated in FIG. 1A). The arithmetic processing unit 2 is composed of, for example, one or more electronic circuit units including a CPU, a RAM, a ROM, an interface circuit and the like, or one or more computers, or a combination of the electronic circuit unit and the computer.

The arithmetic processing unit 2 in the present embodiment has a function for eliminating noise data that can be regarded to have low reliability of distance measurement values from the measurement data output from the LRF 1 as a function implemented by a hardware configuration or a program (software configuration) installed in the arithmetic processing unit 2.

The arithmetic processing unit 2 may be a control unit that has a function for controlling the operation of a mobile body incorporating the LRF 1.

The following will describe the processing for eliminating noise data performed by the arithmetic processing unit 2. First, the processing will be outlined.

If the projection line that indicates the projecting direction of a laser beam is a line that passes through the vicinity of the edge of an object, then the light reflected off of the object and the light reflected off of another object at the back side of the object will frequently be received by the LRF 1 (the so-called multi-echo will frequently take place). In this case, the measurement data of the distance of an object on the projection line tends to be abnormal data. For example, a situation may occur, in which an actual object does not exist at a position indicated by the measurement data.

Figure 3A:
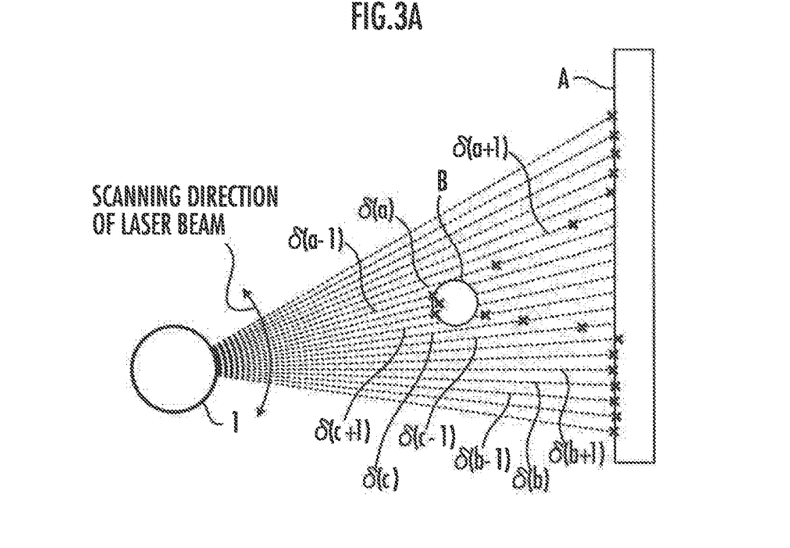
FIG. 3A is a diagram illustrating a scanning laser beam from the laser ranging device (laser range finder) according to the embodiment to an object.

FIG. 3A conceptually illustrates a situation in which such a phenomenon takes place. In this example, an object B having a small diameter, such as a handrail, exists between the LRF 1 and an object A having a relatively large area, such as a wall. FIG. 3A illustrates a situation in which a laser beam (indicated by a dashed line) is directed toward the object A from the LRF 1 at a given rotational angular position (a rotational angular position in the direction about the Z-axis). The points marked with "x" in the drawing indicate the positions of the measurement points defined by the set of the direction of each of the plurality of projection lines of the laser beam and the distance measurement data on each of the projection lines.

The illustrated example indicates that, among the laser beams that pass through the vicinity of the edge of the object B, the measurement points corresponding to the projection lines of the laser beams marked with, for example, reference symbols δ(a+1), δ(a), δ(c+1), δ(c), and δ(c−1) denote the positions that deviate from the actual positions of the object A or B due to the influence of a multi-echo.

Hereinafter, the measurement points obtained at the positions that deviate from actual positions of an object due to the multi-echo associated with the laser beams passing through the vicinity of the edge of the object as described above will be referred to as the noise measurement points.

Figure 2:
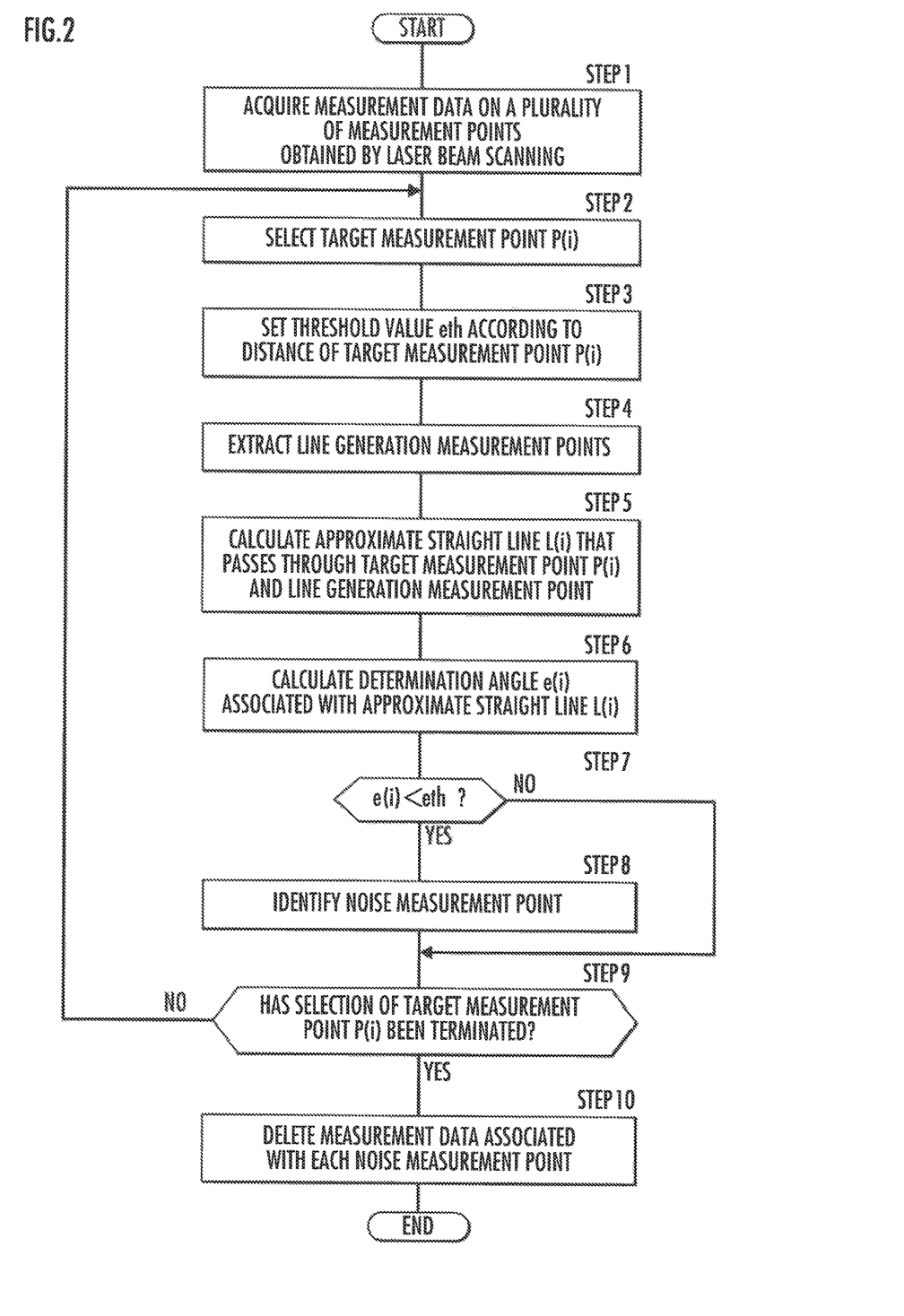
FIG. 2 is a flowchart illustrating the processing performed by an arithmetic processing unit illustrated in FIG. 1A.

In the present embodiment, the arithmetic processing unit 2 identifies such noise measurement points and deletes the measurement data corresponding to the noise measurement points from the measurement data for recognizing an object around the LRF 1. The processing by the arithmetic processing unit 2 is carried out as illustrated by the flowchart of FIG. 2.

In STEP1, the arithmetic processing unit 2 acquires the measurement data of a plurality of measurement points obtained by each scan (rotational scan from one end to the other end of a scanning range) of a laser beam in the direction about the X-axis. The measurement data of each measurement point is composed of a set of, for example, the direction of the laser beam projection line corresponding to each measurement point (the rotational angle in the direction about the X-axis) and the distance measurement value of the measurement point.

The measurement data of each measurement point may be the data (which has the position in each coordinate axis direction as a constituent component) obtained by coordinate-converting the position of the measurement point defined by the set of the direction of the laser beam projection line corresponding to the measurement point and the distance measurement value of the measurement point into a position observed in a randomly chosen orthogonal coordinate system (e.g. a 3-axis orthogonal coordinate system in which a direction that is orthogonal to the X-axis and the Z-axis in FIG. 1A and FIG. 1B is defined as the Y-axis direction).

Subsequently, the arithmetic processing unit 2 selects one measurement point as a target point P(i) in STEP2. Then, in STEP3, the arithmetic processing unit 2 sets a threshold value $e_{th}$ according to the measurement value of the distance of the target measurement point P(i) to identify a noise measurement point. The threshold value $e_{th}$ is a threshold value of a positive value to be compared with a determination angle e(i), which will be discussed hereinafter, and is determined from the measurement value of the distance of the target measurement point P(i) according to an arithmetic expression, a map or the like, which is prepared in advance. In this case, the threshold value et is set to be a smaller value (a value closer to zero) as the measurement value of the distance of the target measurement point P(i) becomes smaller.

Subsequently, in STEP4, the arithmetic processing unit 2 extracts, as line generation measurement points for generating an approximate straight line to be discussed hereinafter, the measurement point or points corresponding to one or more other projection lines that have directions close to the direction of the laser beam projection line corresponding to the target measurement point P(i) that is being selected.

For example, according to the present embodiment, the measurement points P(i+1) and P(i−1) corresponding to two projection lines on both sides of the projection line corresponding to the target measurement point P(i) are extracted as the line generation measurement points. More specifically, the foregoing two projection lines are the projection line in a direction shifted by a predetermined pitch angle in the positive direction about the X-axis (a clockwise direction as facing the positive direction of the X-axis) with respect to the projection line corresponding to the target measurement point P(i) and a projection line in a direction shifted by a predetermined pitch angle in the negative direction about the X-axis (a counterclockwise direction as facing the positive direction of the X-axis) with respect to the projection line corresponding to the target measurement point P(i).

Figure 3B:
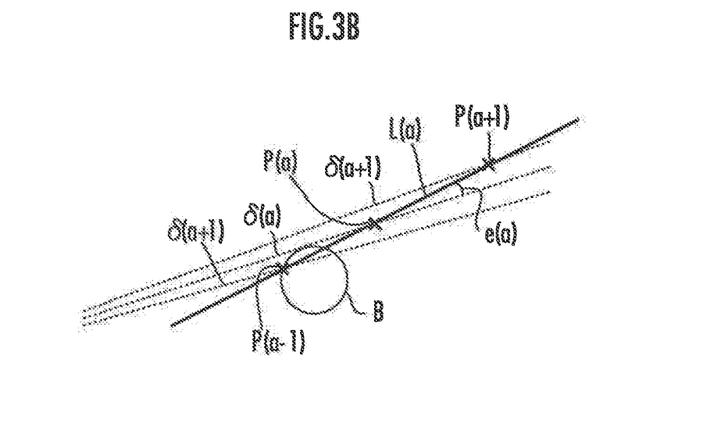
FIG. 3B and FIG. 3C are explanatory diagrams associated with the processing of STEP4 to STEP6 in FIG. 2.

For example, if the target measurement point P(i) is a measurement point corresponding to the laser beam projection line marked with the reference symbol δ(a) in FIG. 3A, then the measurement points (P(a+1) and P(a−1) in FIG. 3B) corresponding to the laser beam projection lines marked with the reference symbols δ(a+1) and δ(a−1) will be extracted as the line generation measurement points.

Figure 3C:
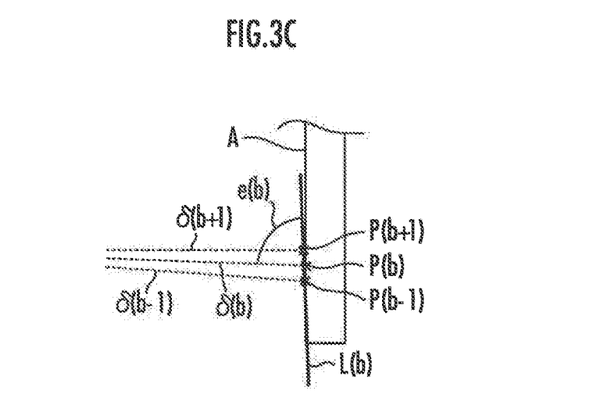

Further, if the target measurement point P(i) is a measurement point corresponding to the laser beam projection line marked with the reference symbol δ(b) in FIG. 3A, then the measurement points (P(b+1) and P(b−1) in FIG. 3C) corresponding to the laser beam projection lines marked with the reference symbols δ(b+1) and δ(b−1) will be extracted as the line generation measurement points.

Supplementarily, in the present embodiment, the target measurement point P(i) and the line generation measurement points P(i+1) and P(i−1) correspond to "the n number of measurement points" in the present invention, and the projection lines of laser beams corresponding to the target measurement point P(i) and the line generation measurement points P(i+1) and P(i−1) correspond to "the n number of projection lines that are close to each other" in the present invention.

Subsequently, in STEP5, the arithmetic processing unit 2 calculates an approximate straight line L(i) that passes through the target measurement point P(i) and the line generation measurement points P(i+1) and P(i−1) by using the distance measurement values of these measurement points P(i), P(i+1) and P(i−1) and the directions (the angle values in the directions about the X-axis) of the projection lines corresponding to these measurement points P(i), P(i+1), and P(i−1). The approximate straight line L(i) is calculated by, for example, the method of least squares.

Further, in STEP6, the arithmetic processing unit 2 calculates, as a determination angle, an angle e(i) (the absolute value of an angle on an acute angle side) formed by the foregoing approximate straight line L(i) and the laser beam projection line corresponding to the target measurement point P(i). The determination angle e(i) provides an index value that indicates the degree of inclination of the approximate straight line L(i) with respect to the laser beam projection line corresponding to the target measurement point P(i).

For example, if the target measurement point P(i) is a measurement point on the laser beam projection line marked with the reference symbol δ(a) in FIG. 3A, then the approximate straight line L(a) illustrated in FIG. 3B is calculated in STEP5. Further, in STEP6, the angle e(a) illustrated in FIG. 3B is calculated as the determination angle.

Further, if the target measurement point P(i) is, for example, a measurement point on the laser beam projection line marked with the reference symbol δ(b) in FIG. 3A, then the approximate straight line L(b) illustrated in FIG. 3C is calculated in STEP5. Further, in STEP6, the angle e(b) illustrated in FIG. 3C is calculated as the determination angle.

In the present embodiment, the laser beam projection line corresponding to the target measurement point P(i) corresponds to the "representative line" in the present invention.

Here, if the target measurement point P(i) or the line generation measurement point P(i+1) or P(i−1) is a measurement point on the laser beam projection line that passes through the vicinity of the edge of an object, then the direction of the approximate straight line L(i) (L(a) in FIG. 3B) calculated in STEP5 will be a direction close to the direction of the laser beam projection line (the laser beam projection line marked with the reference symbol δ(a) in FIG. 3B) corresponding to the target measurement point P(i) (P(a) in FIG. 3B), as illustrated in, for example, FIG. 3B. Therefore, the determination angle e(i) (e(a) in FIG. 3B) in this case will be a relatively small angle.

Meanwhile, if the target measurement point P(i) and the line generation measurement point P(i+1) or P(i−1) are not measurement points corresponding to the laser beam projection lines that pass through the vicinity of the edge of an object, then the direction of the approximate straight line L(i) (L(b) in FIG. 3C) calculated in STEP5 will be a direction that shows a relatively marked difference from the direction of the laser beam projection line (the projecting direction of the laser beam marked with the reference symbol δ(b) in FIG. 3C) corresponding to the target measurement point P(i) (P(b) in FIG. 3C). Hence, the determination angle e(i) (e(b) in FIG. 3C) in this case will be a relatively large angle (an angle close to 90 degrees).

Figure 4A:
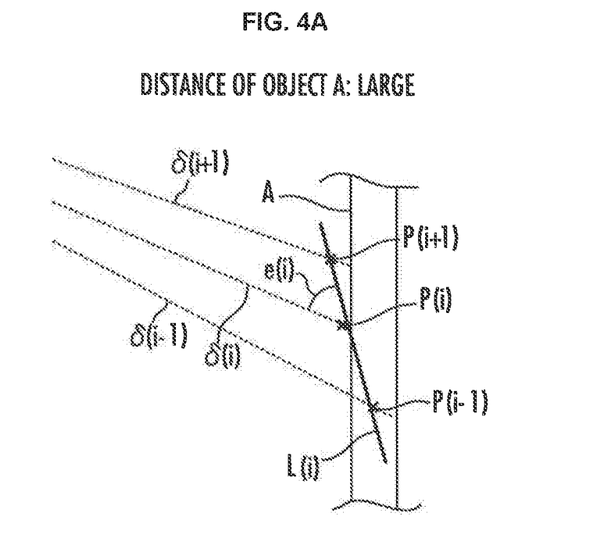
FIG. 4A and FIG. 4B are explanatory diagrams associated with a threshold value set in STEP3 of FIG. 2.
Figure 4B:
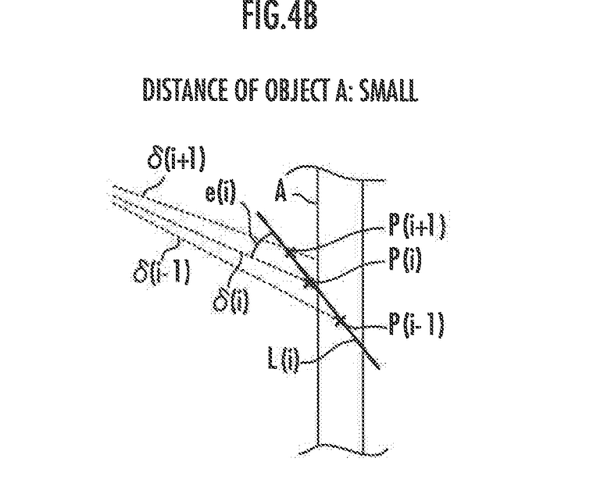

Further, when the variations in the measurement value of the distance of a measurement point on each laser beam projection line attributable to an error of the measurement value (an error in a state in which there are no influences of a multi-echo, and an error in rating attributable to the performance of the LRF 1) are considered, even if a place to which a laser beam is projected is flat, the approximate straight line L(i) calculated in the foregoing STEP5 may tilt as illustrated in FIG. 4A and FIG. 4B with respect to the surface (flat surface) of the projection place due to the variations in the measurement value of distance in the range of the error.

FIG. 4A is an explanatory diagram related to a case where the distance (the distance from the LRF 1) of the object A to which a laser beam is to be projected is relatively large, and FIG. 4B is an explanatory diagram related to a case where the distance of the object A to which a laser beam is to be projected is relatively small.

Further, FIG. 4A illustrates a case where a distance measurement value of the measurement point P(i+1) on the laser beam projection line marked with the reference symbol δ(i+1) has an error in a direction that causes the distance measurement value to be smaller than an actual distance, and FIG. 4B illustrates a case where a distance measurement value of the measurement point P(i+1) on the laser beam projection line marked with the reference symbol δ(i−1) has an error in a direction that causes the distance measurement value to be larger than an actual distance.

As can be seen from the comparison between FIG. 4A and FIG. 4B, the direction of the approximate straight line L(i) is more likely to be closer to the laser beam projection line (the line denoted by the reference symbol δ(i)) corresponding to the target measurement point P(i) due to the variations in the measurement value of the distance in the foregoing error range when the distance of the object is small (FIG. 4B) than when the distance of the object is large (FIG. 4A). This is because the interval of the radiation points of laser beams (the radiation points on the surface of the object A) corresponding to two adjacent projection lines decreases as the distance from the LRF 1 to the object decreases.

According to the present embodiment, therefore, the arithmetic processing unit 2 sets, in the foregoing STEP3, the threshold value $e_{th}$ such that the threshold value $e_{th}$ becomes a smaller value (a value closer to zero) as the measurement value of the distance of the target measurement point P(i) is smaller.

Alternatively, the threshold value $e_{th}$ may be set according to, for example, the average value of the measurement value of the distance (average distance value) of each of the target measurement point P(i) and the line generation measurement points P(i−1) and P(i+1).

Then, the arithmetic processing unit 2 carries out, in STEP7, the processing for comparing the determination angle e(i) determined in STEP6 with the threshold value $e_{th}$ set in STEP3 (the processing for determining whether e(i) <$e_{th}$ applies).

If the result of the determination processing in STEP7 indicates that e(i)<$e_{th}$ applies (if the determination result in STEP7 is affirmative), then the arithmetic processing unit 2 identifies, in STEP8, a measurement point having a largest distance among the target measurement point P(i) and the line generation measurement points P(i+1) and P(i−1) as the noise measurement point. In other words, the arithmetic processing unit 2 identifies the distance measurement data corresponding to the noise measurement point as the noise data.

Thus, if, for example, the target measurement point P(i) is a measurement point on the laser beam projection line marked with the reference symbol δ(a) in FIG. 3A, then the measurement point on the laser beam projection line marked with the reference symbol δ(a+1) (=the line generation measurement point P(a+1) illustrated in FIG. 3B) will be identified as the noise measurement point. Further, if, for example, the target measurement point P(i) is a measurement point on the laser beam projection line marked with the reference symbol δ(c) in FIG. 3A, then the measurement point corresponding to the laser beam projection line marked with the reference symbol δ(c−1) will be identified as the noise measurement point.

Meanwhile, if the result of the determination processing in STEP7 indicates e(i)≥$e_{th}$ (if the determination result in STEP7 is negative), then the arithmetic processing unit 2 does not perform the identification of a noise measurement point (the processing in STEP8).

For example, if the target measurement point P(i) is a measurement point corresponding to the laser beam projection line marked with the reference symbol (b) in FIG. 3A, then the determination result in STEP7 will be negative, so that the identification of a noise measurement point (the processing in STEP8) will not be performed.

If the identification of a noise measurement point is performed in STEP8, or if the determination result in STEP7 is negative, then the arithmetic processing unit 2 determines in STEP9 whether the sequential selection of the target measurement point P(i) has been terminated.

If the determination result is negative, then the arithmetic processing unit 2 returns to the foregoing STEP2 to select a new target measurement point P(i). For example, a measurement point corresponding to a projecting direction that is adjacent to, in the positive direction (or the negative direction) about the X-axis, a laser beam projection line corresponding to a previously selected target measurement point P(i) is selected as the new target measurement point P(i).

The processing from STEP2 to STEP9 is repeated until the determination result in STEP9 becomes affirmative as described above.

Thus, a noise measurement point is identified in an exploratory manner. Until the loop processing from STEP2 to STEP9 is terminated, a measurement point identified as a noise measurement point may be selected as the target measurement point P(i) or the line generation measurement point P(i).

When the determination result in STEP9 becomes affirmative, then the arithmetic processing unit 2 deletes, in STEP10, the measurement data (distance measurement value) related to each noise measurement point identified as described above. More specifically, the arithmetic processing unit 2 deletes, as noise data, the measurement data of the distance in the projecting direction of a laser beam corresponding to each noise measurement point.

Low-reliability measurement data (noise data) attributable to a multi-echo can be properly removed by the processing performed by the arithmetic processing unit 2 described above. In this case, according to the present embodiment, noise data can be identified and removed for each scan of a laser beam in the direction about the X-axis.

In the embodiment described above, three measurement points, namely, the target measurement point P(i) and the line generation measurement points P(i+1) and P(i−1), have been used to calculate the approximate straight line L(i). Alternatively, however, the line generation measurement point (a measurement point other than the target measurement point) for calculating the approximate straight line L(i) may be determined, for example, as described below.

When the spread angle of a laser beam in each projecting direction of a laser beam is denoted by θ, the spread angle θ is approximately represented by expression (1) given below.

$$\theta \approx \lambda/D0 \qquad (1)$$

where λ denotes the wavelength of a laser beam, and D0 denotes the diameter of a laser beam at an output unit of laser beam. Accordingly, the spread angle θ denotes a value inherent to a laser ranging device (the LRF 1 in the foregoing embodiment.

If the edge of an object exists in the spread angle θ of a laser beam, then abnormal measurement data attributable to a multi-echo tends to be generated.

Therefore, for example, a measurement point (including the target measurement point P(i)) corresponding to each projection line in the range of the foregoing spread angle θ, centering on the laser beam projection line corresponding to the target measurement point P(i) (more specifically, in the range of δ(i)±(θ/2), δ(i) denoting the azimuth in the direction about the X-axis of the laser beam projection line corresponding to the target measurement point P(i)) may be used as the measurement point for calculating the approximate straight line.

Further, in the foregoing embodiment, the angle e(i) formed by the laser beam projection line corresponding to the target measurement point P(i) and the approximate straight line L(i) has been used as the index value that indicates the degree of inclination of the approximate straight line L(i). However, as an alternative, for example, the direction may be determined by averaging the directions of projection lines corresponding to a plurality of measurement points used to calculate an approximate straight line, and the angle formed by the line in the averaged direction and the approximate straight line may be used as the index value that indicates the degree of inclination of the approximate straight line L(i).

As another alternative, for example, a projection line in a direction that is closest to a line in the central direction (averaged direction) among the projection lines corresponding to a plurality of measurement points used to calculate an approximate straight line may be used as a representative line, and the angle formed by the representative line and the approximate straight line may be used as the index value that indicates the degree of inclination of the approximate straight line L(i).

Further, the laser ranging device 1 (LRF 1) in the foregoing embodiment performs laser beam scanning by rotating the projecting direction of a laser beam. However, the laser ranging device in accordance with the present invention may be adapted to maintain the projecting direction of a laser beam to be constant or substantially constant and to linearly emit the laser beam in a direction orthogonal to the projecting direction.

What is claimed is:

1. A method for identifying noise data of a laser ranging device among measurement data of distances obtained by the laser ranging device that emits a laser beam in a predetermined direction to measure the distance of each of a plurality of measurement points corresponding to a plurality of projection lines of the laser beam in a scanning range of the laser beam, method comprising:

inputting measurement data of the laser ranging device into an arithmetic processing unit that includes a processor and memory; and identifying noise data using the arithmetic processing unit based on the input measurement data by performing a processing comprising:

a first step of extracting an n (n: an integer of 2 or more) number of measurement points corresponding to an n number of projection lines that are close to each other from the plurality of measurement points, wherein the n number of projection lines connect a common axis point and a respective one of the n number of measurement points, and the n number of projection lines have different angles about the common axis point from each other;

a second step of calculating an approximate straight line that passes through the n number of measurement points by using the measurement data of the distance of each of the n number of measurement points, the approximate straight line being calculated by method of least squares;

a third step of determining a degree of inclination of the approximate straight line with respect to a representative line of the projection lines corresponding to the n number of measurement points or an averaged line, the representative line being one of the n number of projection lines that corresponds with a target measurement point of the n number of measurement points, the averaged line being a line projecting from the common axis point and having an angle about the common axis point that is an average of the different angles of the n projection lines corresponding to the n number of measurement points, and the degree of inclination being determined based on an angle formed at an intersection of the approximate straight line and the representative line or the averaged line; and a fourth step of identifying, as noise data, the measurement data on a measurement point having a largest distance measurement value among the n number of measurement points in a case where the degree of inclination is smaller than a predetermined threshold value.

2. The method for identifying noise data of the laser ranging device according to claim 1, wherein the processing from the first step to the fourth step is repeatedly carried out, and the processing in the first step of each cycle is carried out such that at least one measurement point among the n number of measurement points extracted in the first step of each cycle of the repetition is a measurement point that is different from measurement points extracted in the first step of another cycle.

3. The method for identifying noise data of the laser ranging device according to claim 2, wherein the processing further comprises:

a fifth step of variably setting the predetermined threshold value used in the fourth step according to a representative value of the distance measurement values of the n number of measurement points or an average distance value obtained by averaging the distance measurement values of the n number of measurement points.

4. The method for identifying noise data of the laser ranging device according to claim 1, wherein the processing further comprises:

a fifth step of variably setting the predetermined threshold value used in the fourth step according to a representative value of the distance measurement values of the n number of measurement points or an average distance value obtained by averaging the distance measurement values of the n number of measurement points.

* * * * *